Oct. 21, 1924.
P. H. GASKINS
LUBRICATING SYSTEM
Filed Aug. 6, 1923
1,512,216
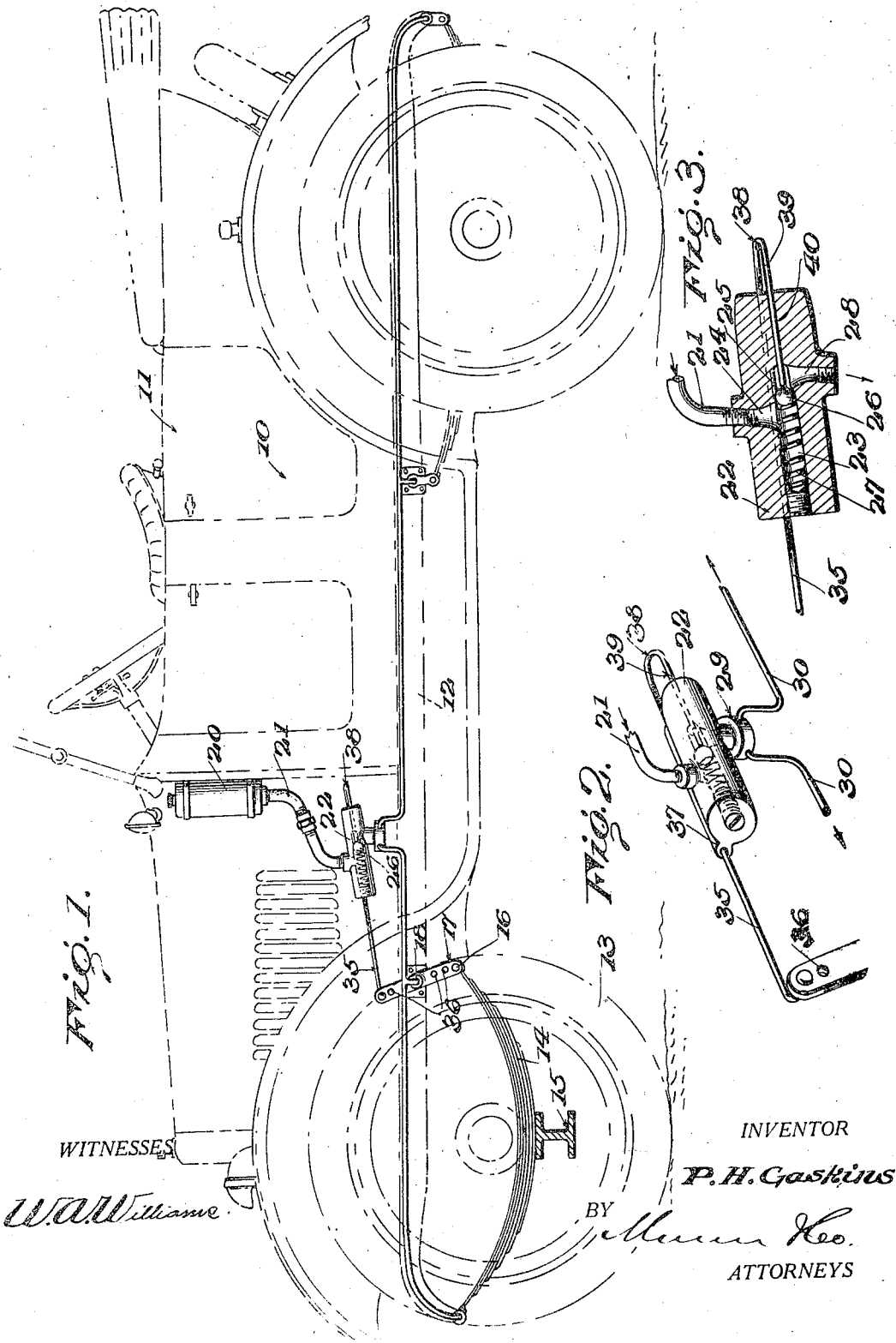
WITNESSES
INVENTOR
P. H. Gaskins
BY
ATTORNEYS Patented Oct. 21, 1924.

1,512,216

UNITED STATES PATENT OFFICE.

PALEMON H. GASKINS, OF JACKSONVILLE, FLORIDA.

LUBRICATING SYSTEM.

Application filed August 6, 1923. Serial No. 655,969.

*To all whom it may concern:*

Be it known that I, PALEMON H. GASKINS, a citizen of the United States, and a resident of Jacksonville, in the county of Duval and State of Florida, have invented certain new and useful Improvements in Lubricating Systems, of which the following is a specification.

This invention relates to an improvement in lubricating systems especially adapted for use with motor vehicles, such as automobiles or the like, and is of the type forming the subject matter of my co-pending application filed November 24, 1922, Serial #603,050.

The object of the invention is to provide a lubricating system which will automatically supply to the parts to be lubricated the proper amount of lubricant at the times when thorough lubrication is most needed, and wherein the elements of the system are so designed, constructed and arranged that they are best adapted to stand the strains and stresses to which they are subjected in use.

Other objects and advantages of the invention reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing the preferred embodiment of the invention applied to an automobile, the showing of the automobile being largely diagrammatic, Figure 2 is a fragmentary perspective view of the valve control and adjusting head detached, Figure 3 is a view in vertical section through the valve control.

Referring to the drawings wherein for the sake of illustration is shown the preferred embodiment of the invention, the numeral 10 designates generally an automobile. It is to be understood however, that the invention is applicable to various types of vehicles, it being shown applied to an automobile for the sake of illustration. The automobile may be of any standard construction and usually includes a body 11 supported on a chassis or frame 12, which is in turn mounted on the wheels 13 by springs 14 and axles 15. The springs may be connected with the axle and the chassis in any approved manner, and in the arrangement shown, one end of the front spring is pivotally connected as at 16 to one end of a shackle 17, the shackle 17 being connected intermediate its ends as at 18 to the chassis 12 of the vehicle. This much of the structure of the vehicle is referred to specifically, since the flexure of the spring is utilized as the motive agency for actuating or opening the valve of the lubricant control as will be presently described.

The lubricant system which constitutes the present invention includes a reservoir 20 mounted on the cowl dash of the automobile at a point well above the parts to be lubricated and containing the supply of oil or lubricant. From the bottom of the reservoir 20 a discharge pipe 21 leads and connects with one end of a valve casing of the valve block 22. The valve casing 22 is provided with a cavity 23 communicating by a lateral opening 24 with the discharge pipe 21. The cavity or chamber 23 is provided with a valve seat 25 therein with which a ball valve 26 co-acts, the ball valve being held against its seat by a coil spring 27. On the opposite side of the seat 25 from a point at which the lateral opening 24 communicates with the chamber a lateral outlet opening 28 is provided and connects with a distributing head 29 from which pipes or conveying devices 30 extend to the points to be lubricated. This distributing head is shown and described in detail in my co-pending application, filed November 24, 1922, Serial #603,050.

With this arrangement the flow of the lubricant from the flow of the reservoir through the valve block or casing to the distributing head and the conveying devices is normally prevented as the spring 27 yieldably holds the valve 26 against its seat 25 to prevent flow of lubricant past the valve.

Means is provided for opening the valve 26 in accordance with the flexure of the spring 14, and preferably comprises an elongated steel wire 35 having one end adjustably connected to the shackle 17 through any one of a plurality of openings 36 provided in the shackle. In between its ends the steel wire is slidably fitted in a cylindrical guide 37 provided therefor on the valve casing or block 22, and beyond the guide 37 the wire is bent back to provide a U-shaped end 38. One arm 39 of the U-shaped end 38 is slidably fitted in the opening 40 provided therefor in the valve block 22, and is engageable with the ball valve 26. It is to be understood that any suitable means may be provided for adjustably connecting the wire 35 to the shackle 17. For instance, the wire may be provided with a transverse opening and a cotter pin may be employed in conjunction with the opening for securing the wire in any one of the holes 36. With this arrangement, when the wire 35 is pulled to the left as viewed in Figures 1, 2 and 3, its arm 40 opens the valve 26 and permits the flow of lubricant. The wire 36 can be arranged to be pulled to the left on either the impact or rebound by varying the connection of its end to the shackle 17. The arrangement is highly advantageous in that the wire 35 is subjected only to tension, there being no force acting upon it tending to bend or buckle it and the necessity of encasing the wire 35 is avoided. The bight of the U-shaped portion 38 occurs between the two parts of the wire that are reinforced and supported by the guide 37 and the opening 40.

I claim:—

1. In a lubricating system for use with automobiles having a spring mounted for flexure, the mounting of the spring including a shackle, a lubricant supply, a valve casing connected with the lubricant supply and having a spring valve therein, conveying devices connected with the valve casing and with the points to be lubricated, and means for opening the valve in accordance with the flexure of the spring, including a steel wire having one end connected to the shackle, and having its opposite end of U-shaped form, and arranged to engage the valve when the wire is pulled.

2. In a lubricating system for use with automobiles having a spring mounted for flexure, the mounting of the spring including a shackle, a lubricant supply, a valve casing connected with the lubricant supply and having a spring valve therein, conveying devices connected with the valve casing and with the points to be lubricated, and means for opening the valve in accordance with the flexure of the spring, including a steel wire having one end connected to the shackle, and having its opposite end of U-shaped form, and arranged to engage the valve when the wire is pulled, said valve casing having a guide receiving the steel wire and having an opening receiving one of the arms of the U-shaped end of the wire, said arm being engageable with the spring closed valve.

3. In a lubricating system for use with vehicles having a spring mounted for flexure, a spring closed valve for controlling the flow of lubricant, and means for opening said valve as the spring is flexed and including a steel wire having one end connected to the spring, said steel wire being also cooperable with the valve for opening the valve as the wire is pulled.

PALEMON H. GASKINS.